(12) United States Patent
Kim

(10) Patent No.: US 12,399,098 B2
(45) Date of Patent: Aug. 26, 2025

(54) IMAGE INFORMATION ACQUISITION DEVICE

(71) Applicant: THE WAVE TALK, INC., Daejeon (KR)

(72) Inventor: Young Dug Kim, Seongnam-si (KR)

(73) Assignee: THE WAVE TALK, INC., Daejeon (KR)

( * ) Notice: Subject to any disclaimer, the term of this patent is extended or adjusted under 35 U.S.C. 154(b) by 327 days.

(21) Appl. No.: 17/905,726

(22) PCT Filed: Sep. 24, 2020

(86) PCT No.: PCT/KR2020/012943
§ 371 (c)(1),
(2) Date: Sep. 6, 2022

(87) PCT Pub. No.: WO2021/182700
PCT Pub. Date: Sep. 16, 2021

(65) Prior Publication Data
US 2023/0349805 A1 Nov. 2, 2023

(30) Foreign Application Priority Data
Mar. 9, 2020 (KR) ........................ 10-2020-0029157

(51) Int. Cl.
*G01N 15/0205* (2024.01)
*G01N 15/0227* (2024.01)
*G01N 15/10* (2024.01)

(52) U.S. Cl.
CPC ..... *G01N 15/0211* (2013.01); *G01N 15/0227* (2013.01); *G01N 15/10* (2013.01)

(58) Field of Classification Search
CPC . G01N 15/0211; G01N 15/0227; G01N 15/10
See application file for complete search history.

(56) References Cited

U.S. PATENT DOCUMENTS

2015/0138564 A1    5/2015  Jung et al.
2020/0257099 A1*   8/2020  Takahashi ............ G02B 21/367

FOREIGN PATENT DOCUMENTS

CN        105444665 A  *  3/2016
JP       2016005437 A  *  1/2016
(Continued)

OTHER PUBLICATIONS

International Search Report and Written Opinion for PCT/KR2020/012943 dated Jan. 13, 2021, all pages.

*Primary Examiner* — Michael J Dalbo
*Assistant Examiner* — Kaleria Knox
(74) *Attorney, Agent, or Firm* — Kilpatrick Townsend & Stockton LLP

(57) ABSTRACT

An embodiment of the present invention provides an image information acquisition device comprising: a sample unit for accommodating a sample; a driver for moving the sample unit in a first direction; a light source for irradiating light to a partial region of the sample unit; an optical mirror for reflecting the light having passed through the sample unit, by scattering or diffraction of the light; an image sensor for recording in time-series an interference image generated by light reflected from the optical mirror; and a controller for generating image information of the sample based on a time-dependent change of the interference image.

4 Claims, 5 Drawing Sheets

(56) References Cited

FOREIGN PATENT DOCUMENTS

| | | | | |
|---|---|---|---|---|
| JP | 6315655 | B2 | 4/2018 | |
| JP | 2018179709 | A | 11/2018 | |
| JP | 2019105474 | A * | 6/2019 | |
| JP | WO2019097587 | A1 | 10/2020 | |
| KR | 2016-0036959 | A | 7/2016 | |
| KR | 10-1686766 | B1 | 12/2016 | |
| KR | 101686766 | A * | 12/2016 | ............. G01N 33/02 |
| KR | 10-1911592 | B1 | 10/2018 | |
| KR | 102315435 | B1 * | 10/2021 | ......... G01N 15/0205 |
| WO | WO-03021231 | A2 * | 3/2003 | ............. G01N 21/47 |
| WO | 2021/182700 | A1 | 9/2021 | |

\* cited by examiner

IMAGE INFORMATION ACQUISITION DEVICE

CROSS-REFERENCE TO RELATED APPLICATION

The present application is a U.S. national phase application under 35 U.S.C. 371 of International Application No. PCT/KR2020/012943, filed on Sep. 24, 2020, which claims the benefit of Korean Patent Application No. 10-2020-0029157 filed on Mar. 9, 2020 in the Korean Intellectual Property Office, the entire disclosure of each of which is incorporated herein by reference.

TECHNICAL FIELD

Embodiments of the present invention relate to an apparatus for acquiring image information.

BACKGROUND ART

Various pathogenic microorganisms such as bacteria, fungi, and viruses appear and inhabit in the blood, body fluids and tissues of the human body, causing infectious diseases. In recent years, pathogenic infections have emerged greatly in society, and the frequency thereof is gradually increasing. Pathogenic infections, which have started to become a legal issue in the medical field, can lead to loss of life if not properly treated. Accordingly, early diagnosis and rapid treatment without complications are required. Therefore, there is a need to develop an accurate and rapid diagnostic method of these pathogenic microorganisms.

Furthermore, recently, the misuse of antibiotics has led to a decrease in the culture rate of bacteria, and since the use of immunosuppressants following the transplant is increased, the dose of the drug administration is increased due to anti-cancer treatment, and an increased AIDS incidence has led to a variety of bacteria causing the increased number of bacteria, diagnostic methods for diagnosing existing infectious diseases such as embryo tests are increasingly facing difficulties.

DETAILED DESCRIPTION OF INVENTION

Technical Problem

The present invention aims to provide an image information acquisition device capable of confirming the presence or absence of an object in a sample unit by inducing scattering or diffraction.

Solution to Problem

An embodiment of the present invention provides an image information acquisition device comprising: a sample unit for accommodating a sample; a driver for moving the sample unit in a first direction; a light source for irradiating light to a partial region of the sample unit; an optical mirror for reflecting the light having passed through the sample unit, by scattering or diffraction of the light; an image sensor for recording, in time series, an interference image generated by light reflected from the optical mirror; and a controller for generating image information of the sample based on a time-dependent change of the interference image.

In one embodiment of the present invention, the image information acquisition device may further include a light path changing unit disposed between the sample unit and the optical mirror and configured to transmit light that has passed through the sample unit to the optical mirror and transmit the light reflected from the optical mirror to the image sensor by changing a path of the reflected light.

In one embodiment of the present invention, the control unit may divide the interference image into a plurality of divided regions, and generate image information of the sample based on time-dependent changes in each of the divided regions.

In one embodiment of the present invention, a size of the divided region may be determined by scattering intensity or diffraction intensity in the optical mirror.

In an embodiment of the present invention, the image sensor may record the interference image in time series while the driver is moving the sample unit at a preset speed along the first direction.

In one embodiment of the present invention, the controller may generate the image information of the sample using a temporal correlation of the interference image and a spatial correlation of the interference image.

Additional aspects, features, and advantages, other than those described above, will be apparent from the drawings, claims, and written description below. Additional features of the invention will be set forth in the description which follows, and in part will be apparent from the description, or may be learned by practice of the invention.

Advantageous Effects

An image information acquisition device according to embodiments of the present invention can effectively identify a small object in a large area of a sample. Also, according to the image information acquisition device in accordance with embodiments of the present invention, an existing image signal may be amplified and thus an object can be identified even when the object appears transparent since the degree of reflection of the object is similar to that of a sample which is a medium.

BEST MODE FOR INVENTION

Figure 1:
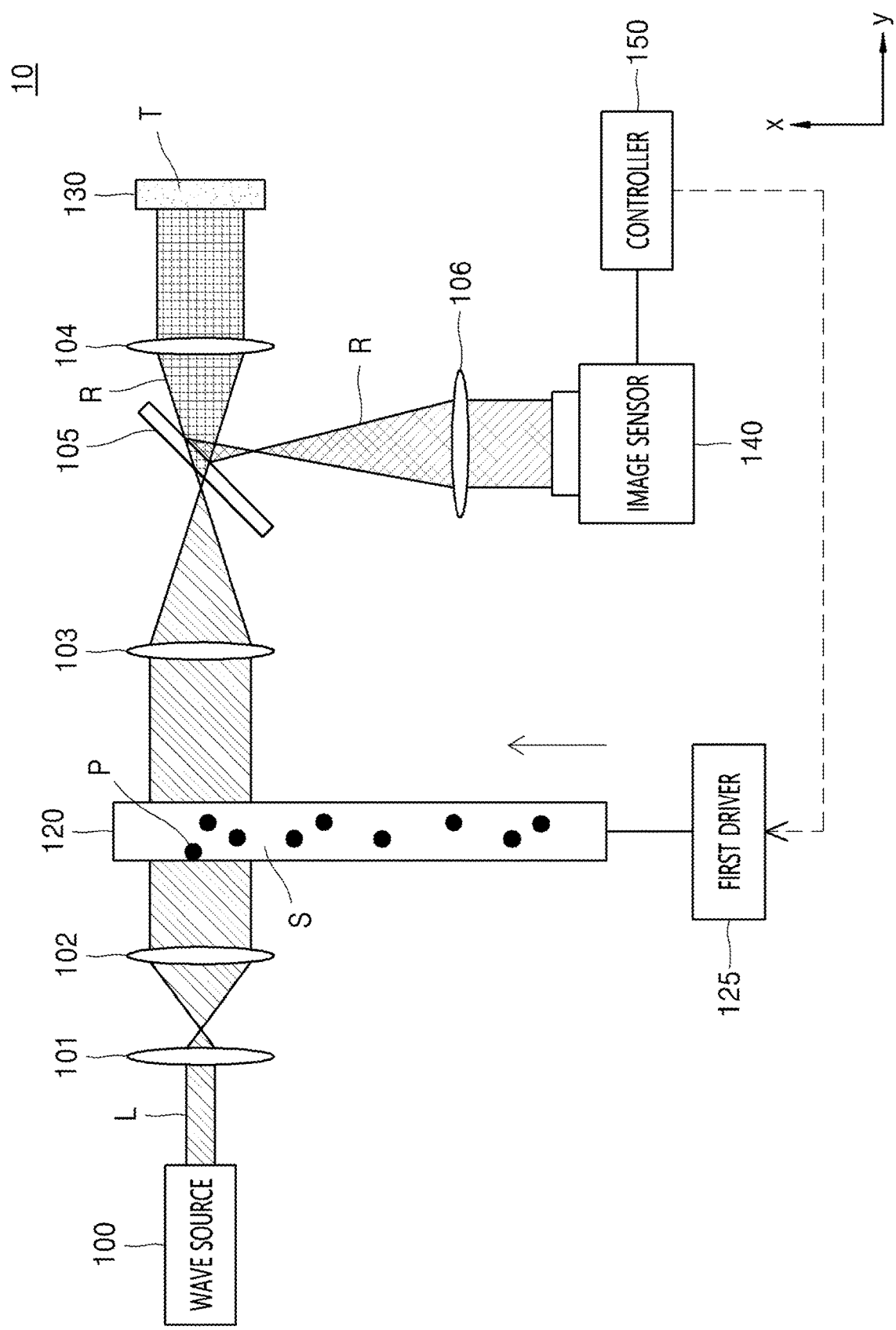
FIG. 1 is a conceptual diagram schematically showing an image information acquisition device according to an embodiment of the present invention.

Hereinafter, the following embodiments will be described in detail with reference to the accompanying drawings, and in the following description with reference to the drawings, like or corresponding components are denoted by like reference numerals, and redundant descriptions thereof will be omitted.

Since the present embodiments may apply various changes, specific embodiments are illustrated in the drawings and will be described in detail in the detailed description. The effects and features of the embodiments and methods of achieving the same will become apparent with reference to the following descriptions in detail with reference to the drawings. However, the embodiments are not limited to the embodiments set forth herein, but may be implemented in many different forms.

In the following embodiments, the terms "first" and "second" are not limited and are used to distinguish one component from other components.

In the following embodiments, the singular forms "a," "an" and "the" are intended to include the plural forms as well, unless the context clearly indicates otherwise.

In the following embodiments, it will be understood that the terms "comprises" and/or "comprising" used herein specify the presence of stated features or components, but do not preclude the presence or addition of one or more other features or components.

In the following embodiments, when an element, such as a unit, a region, or a component, is referred to as being "on" another element, this includes a case where another unit, region, or component is formed therebetween, in addition to a case where one element is formed directly on the other element.

In the following embodiments, unless the terms "connecting" or "coupling" are clearly different in context, the terms "connecting" or "coupling" do not necessarily mean direct and/or fixed connection or coupling of two members, but do not exclude a member located between the two members.

It will be understood that stated features or components are present, but the presence or addition of one or more other features or components are not precluded.

Sizes of components in the drawings may be exaggerated for convenience of explanation. In other words, since sizes and thicknesses of components in the drawings are arbitrarily illustrated for convenience of explanation, the following embodiments are not limited thereto.

Figure 2:
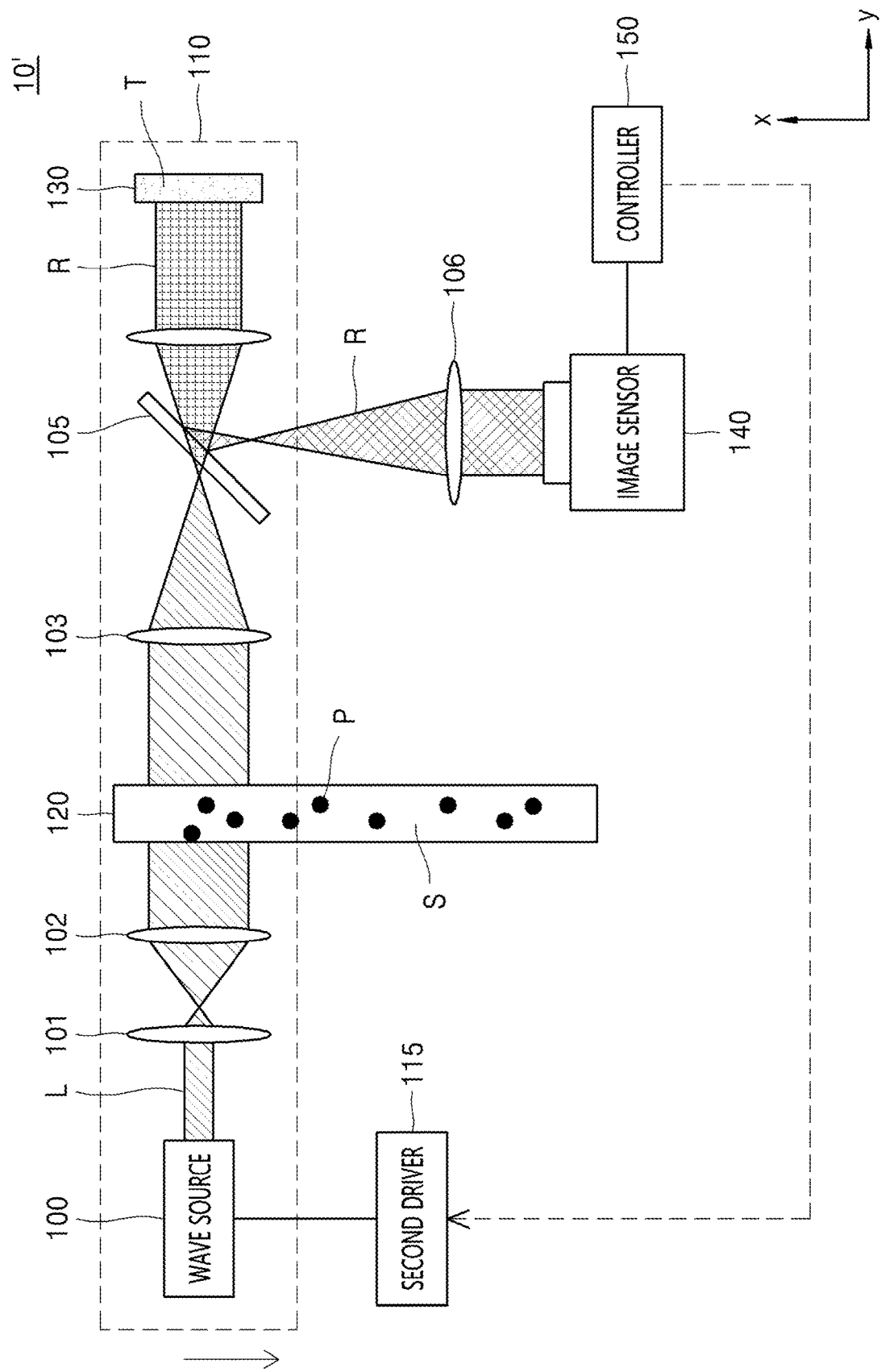
FIG. 2 is a conceptual diagram schematically showing an image information acquisition device according to another embodiment of the present invention.

FIG. 1 is a conceptual diagram schematically showing an image information acquisition device 10 according to an embodiment of the present invention, and FIG. 2 is a conceptual diagram schematically showing an image information acquisition device 10' according to another embodiment of the present invention.

Referring to FIG. 1, the image information acquisition device 10 according to an embodiment of the present invention may include a light source 100, a sample unit 120, a first driver 125, an optical mirror 130, an image sensor 140, and a controller 150.

The light source 100 may produce single- or multicolored light L. For example, the light source 100 may be a source device configured to produce single-colored light, such as a gas laser, a semiconductor laser, or a laser diode. Alternatively, the light source 100 may be a source device configured to produce multicolored light L, such as a halogen lamp, a xenon lamp, or a white light emitting diode.

The light source 100 may emit light L to a region of the sample unit 120, and in this case, light transmitting units 101 and 102 may be disposed between the light source 100 and the sample unit 120. As an embodiment, the light transmitting units 101 and 102 may perform a function of transmitting the light L produced by the light source 100 as an expanded parallel light beam. The light transmitting units 101 and 102 may be configured with a plurality of optical lenses, as shown. As another embodiment, the light transmitting units 101 and 102 may be configured as collimators that collimate the light L produced by the light source 100 into an expanded parallel light beam. Alternatively, the light transmitting units 101 and 102 may be made of an optical fiber which is a flexible light transmitting medium, and may replace the function of the collimator.

The sample unit 120 may accommodate a sample S. The sample S may be accommodated through a sample positioning means, such as a container, and may be accommodated in a static state. For example, the sample S may be accommodated in a solid state. The sample unit 120 may have a first area in a plane direction perpendicular to the irradiation direction (Y direction) of the light L, and the first area may be greater than a second area of the light irradiated by the light source 100. In other words, the light source 100 may emit the light to a region of the sample unit 120, and the image information acquisition device 10 of the present invention may acquire image information for the entire area of the sample S accommodated in the sample unit 120 through movement of the sample unit 120.

To this end, the sample unit 120 may be connected to the first driver 125. The first driver 125 may move the sample unit 120 along a first direction (X direction). The first driver 125 may include a motor or an actuator for providing a driving force to the sample unit 120. The first driver 125 may move the sample unit 120 in one direction for scanning, or may reciprocate the sample unit 120 to vibrate. However, the present invention is not necessarily limited thereto. As another embodiment, since the measurement area that can be obtained by one measurement is determined, the image information acquisition device 10 of the present invention may acquire image information for the entire area of the sample while moving the sample unit 120 along a preset scan path in the first direction (X direction) or the second direction (Y direction) perpendicular to the first direction (X direction).

The first driver 125 may move the sample unit 120 at a preset speed. As will be described below, the image information acquisition device 10 of the present invention may obtain the image information of the sample S by using spatial correlation of interference images due to the movement of the sample unit 120. The first driver 125 may move the sample unit 120 at a preset speed in order to derive the spatial correlation of the interference images. For example, the first driver 125 may move the sample unit 120 at a speed of 05 cm/s to 15 cm/s. If the sample unit 120 moves too fast, the resolution of the interference image is lowered, making it difficult to accurately detect an object. If the sample unit 120 moves too slowly, a problem may arise in that a spatial correlation between the interference images cannot be induced. In addition, the aforementioned speed may be determined by a detection speed recorded by the image sensor 140.

Referring to FIG. 2, the image information acquisition device 10' according to another embodiment of the present invention may be provided with a second driver 115 instead of the first driver 125. Specifically, the image information acquisition device 10 according to an embodiment performs a function of moving the sample unit 120 using the first driver 125, while the image information acquisition device 10' according to another embodiment may move an optical system 110 except for the sample unit 120 using the second driver 115. In this case, the optical system 110 may include at least a light source 100 and an optical mirror 130, and may further include optical units such as an optical lens disposed on a light path. Meanwhile, in this case, the position of the image sensor 140 and the positions of optical units disposed on the path of light R reflected from the optical mirror 130 may also be changed as needed.

Referring back to FIG. 1, the optical mirror 130 may reflect the light L that has passed through the sample unit 120 by scattering or diffraction. The optical mirror 130 may be disposed on the path of the light L that has passed through the sample unit 120, and may include a scatterer T on at least a reflective surface or have a diffraction grating structure so as to scatter or diffract the incident light L. For example, a scatterer T such as titanium oxide ($TiO_2$) may be disposed on at least the surface of the optical mirror 130. However, the present invention is not necessarily limited to the optical mirror, and may have a lens structure that transmits light incident through the sample unit 120 by scattering or diffracting.

The image information acquisition device 10 may further include a light path changing unit 105. The light path changing unit 105 may be disposed between the sample unit 102 and the optical mirror 130, and may transmit the light L that has passed through the sample unit 120 to the optical mirror and transmit the light R reflected by the optical mirror 130 to the image sensor 140 by changing the path of the reflected light R. The light path changing unit 105 may be formed as a beam splitter, and may split the light L emitted from the light source 100 and transmit a part of the split light to the optical mirror 130. Also, the light path changing unit 105 may reflect the light R reflected from the optical mirror 130 and transmit the reflected light to the image sensor 140. In this case, the one or more optical lenses 103 and 104 may be disposed between the sample unit 120 and the light path changing unit 105 and between the light path changing unit 105 and the optical mirror 130.

The image sensor 140 may record an interference image produced by the light R reflected from the optical mirror 130 in time series. The image sensor 140 may be implemented as at least one image sensor, such as a charge coupled device (CCD), a complimentary metal-oxide semiconductor (CMOS), or the like. The image sensor 140 may record the interference image in time series while the first driver 125 is moving the sample unit 120 at a preset speed along the first direction (X-direction).

The controller 150 may generate image information of the sample S based on a time-dependent change of the interference image recorded by the image sensor 140. The controller 150 may be a processor capable of processing data. For example, the controller 150 may refer to a data processing device which has a physically structured circuit to perform a function represented as a code or instruction included in a program and is embedded in a hardware device.

Examples of the data processing device embedded in the hardware device as described above may include a microprocessor, a central processing unit (CPU), a processor core, a multiprocessor, an application-specific integrated circuit (ASIC), a field programmable gate array (FPGA), and the like. However, the scope of the present invention is not limited thereto.

The controller 150 may acquire the image information of the sample S based on the time-dependent change of the interference image recorded in time series, more specifically, temporal correlation of the interference image, and may detect the presence or absence of an object P, such as impurities or microorganisms, in the sample S from the image information. Hereinafter, a method of detecting the object P by the controller 150 will be described in greater detail.

Figure 3:
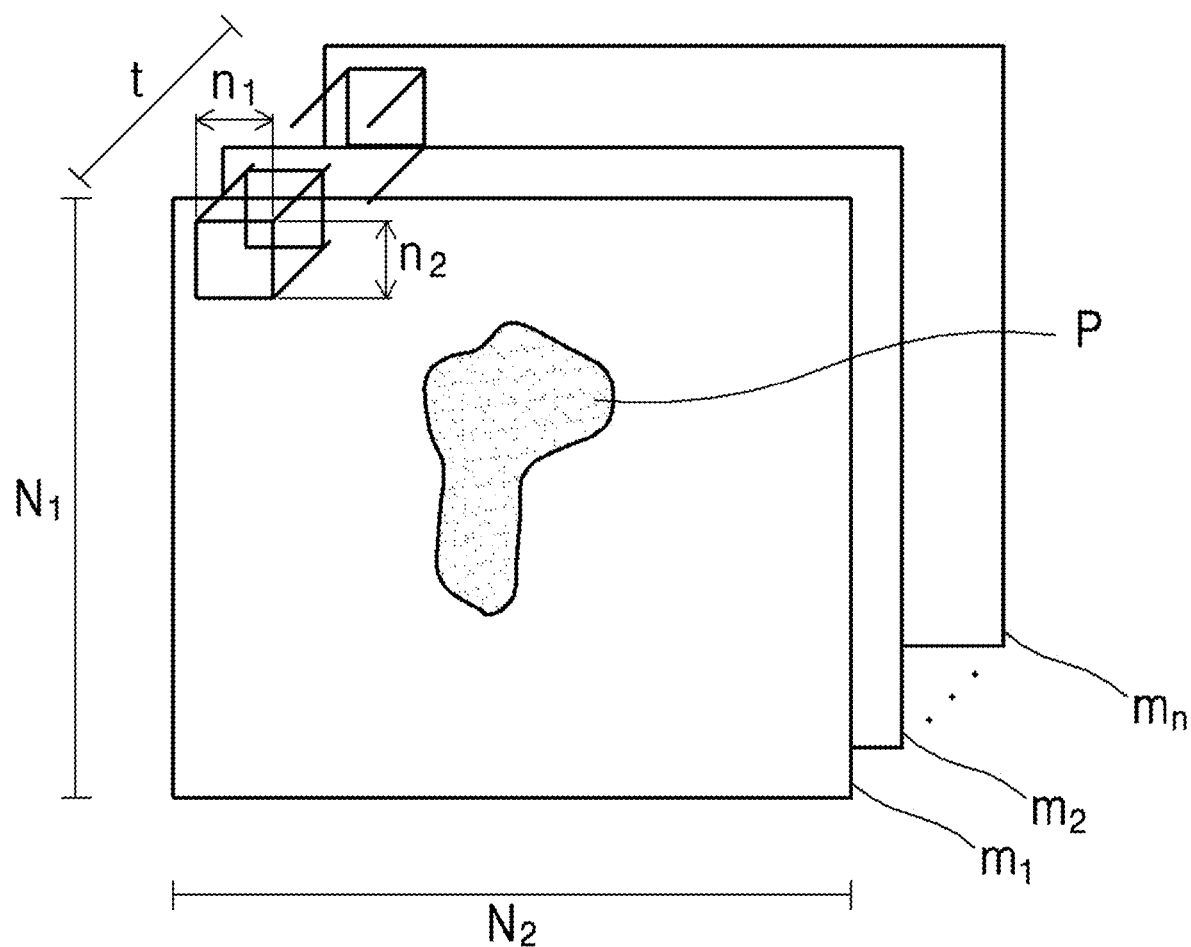
FIGS. 3 and 4 are diagrams for explaining a process of acquiring image information by using an interference image recorded in time series in a control unit.
Figure 4:
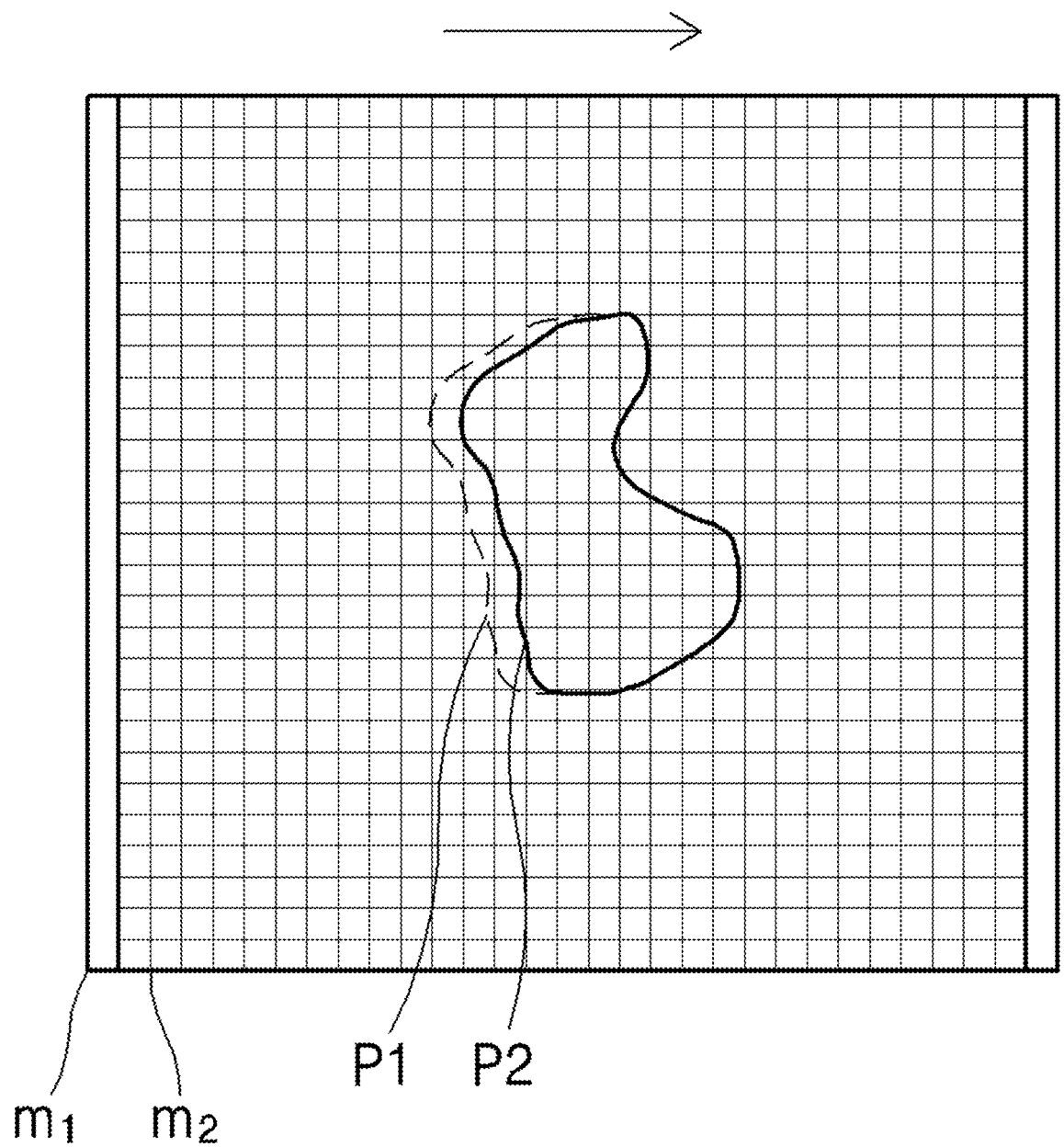

FIGS. 3 and 4 are diagrams for explaining a process of acquiring image information by using an interference image recorded in time series in the control unit.

Referring to FIGS. 3 and 4, the controller 150 may detect the object P in the sample P using the difference between the interference images over time. The controller 150 may acquire the image information for the sample S using the temporal correlation between a plurality of interference images m1, m2, . . . , and mn recorded in time series. Here, the image information may include interference information of interference images generated due to the light R scattered or diffracted by the optical mirror 130. The interference information may include interference pattern information or intensity information of light.

The controller 150 may obtain the temporal correlation of the interference information, and determine whether the object P is present in the sample S by using the change in the temporal correlation. Here, the controller 150 may divide the plurality of interference images m1, m2, . . . , and mn recorded in time series into a plurality of divided regions, and may generate the image information of the sample S based on time-dependent changes in each of the divided regions.

The image sensor 140 of the present invention acquires the interference image using the light R reflected from the reflection mirror 130. Scattering or diffraction during the process in which the light that has passed through the sample unit 120 is reflected by the optical mirror 130 causes a rather weak interference, whereby the interference image may be generated. Therefore, there may be no significant difference over time between the plurality of interference images m1, m2, . . . , and mn when compared over the entire area detected by the image sensor 140.

The controller 150 of the present invention may divide the area of the plurality of interference images m1, m2 . . . , and mn into a plurality of divided regions without analyzing the entire area, so that the time-dependent change in a local area can be identified. If the entire area of the interference image recorded by the image sensor 140 consists of N1×N2 pixels, the controller 150 may divide the interference image into n1×n2 pixels and detect the time-dependent change of each divided region. n1 and n2 may be the same integers, but the present invention is not limited thereto. The controller 150 may generate the image information for each divided region based on the time-dependent change, and check the presence or absence of the object P in the sample S based on the image information.

Here, the size of the divided region may be determined by the scattering intensity or diffraction intensity in the optical mirror 130. Specifically, when the scattering intensity or diffraction intensity in the optical mirror 130 is small, the interference information in the interference image is so fine that the controller 150 may divide the interference image into small divided regions for analysis. In contrast, when the scattering intensity or diffraction intensity in the optical mirror 130 is large, the interference information in the interference image is relatively large, so that the controller 150 may divide the interference image into relatively large divided regions for analysis. The scattering intensity or diffraction intensity of the optical mirror 130 may be determined by the degree of inclusion of the scatterer T disposed in the optical mirror 130 or the pattern interval of the diffraction grating structure.

Since the sample S is moved in one direction by the first driver 120 described above, the interference image may appear as if it shows the object P moving as shown in FIG. 4. The controller 150 may generate the image information by using not only the time-dependent change but also the space-dependent change. That is to say, in the interference image, not only the interference information but also adjacent pixel information may be changed with time due to the object P that moves relatively as the sample unit 120 moves. The controller 150 may generate the image information of the sample S using the temporal correlation of the interference image and spatial correlation of the interference image, and through this, the object P can be more accurately detected.

Figure 5:
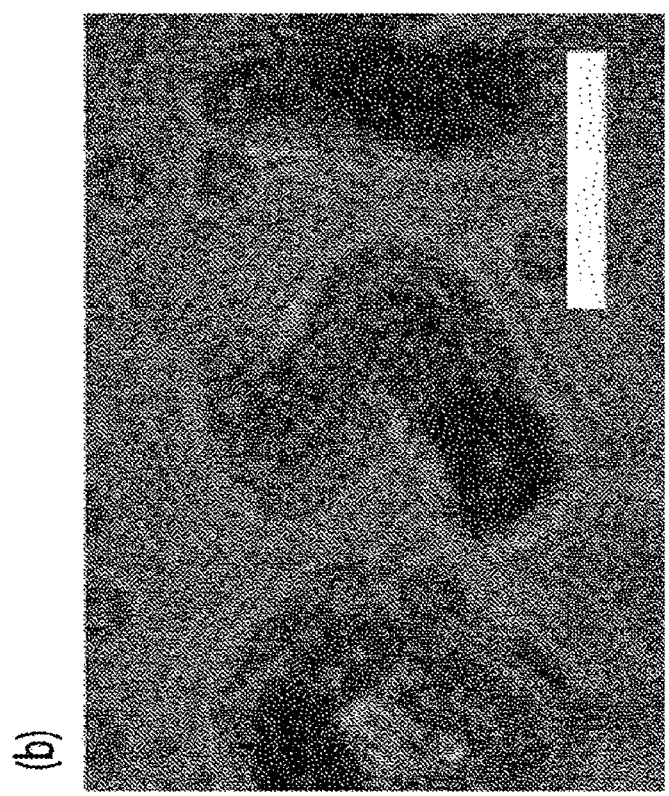
FIG. 5 shows photographs comparing an image including image information acquired using an image information acquisition device according to an embodiment of the present invention with an image acquired by comparative examples.
Figure 5:
Figure 5:

FIG. 5 shows photographs comparing an image including image information acquired using an image information acquisition device according to an embodiment of the present invention with images acquired by comparative examples. FIG. 5 presents photographs of latex beads with a size of 100 μm included in phytagel, which is a medium. (a) of FIG. 5 is a conventional microscope image, (b) is a forward image of laser speckle produced by multiple scattering in a sample, and (c) is an image obtained from the image information acquisition apparatus according to an embodiment of the present invention. The scale bar is 1 mm.

Referring (a) of FIG. 5, in the conventional microscope image, the sample is clearly captured, but when the object, which is a particle, is too small or has a refractive index similar to that of the sample's medium and appears transparent, it may be difficult to identify it. Referring to (b) of FIG. 5, since the image of laser speckle produced by multiple scattering within the sample appears as an interference pattern, it may be difficult to distinguish between objects when adjacent objects exist. As shown in (c) of FIG. 5, the image information acquisition device 10 according to an embodiment of the present invention scatters or diffracts light that has passed through the sample unit, and acquires image information based on a time-dependent change of the resulting interference image or a space-dependent change of the interference image. Accordingly, it may be confirmed that the object is distinguished and extracted as an image with a shining boundary. Also, the image information acquisition device according to an embodiment of the present invention analyzes the image by dividing the image into local regions, and thus can accurately detect a small object in a large area.

The image information acquisition device 10 according to embodiments of the present invention uses the image information acquired through the process described above and hence can effectively identify a small object P in the large area of the sample S. Also, according to the image information acquisition device 10 in accordance with embodiments of the present invention, an existing image signal may be amplified and thus the object P can be identified even when the object P appears transparent since the degree of reflection of the object P is similar to that of the sample S which is a medium.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

According to an embodiment of the present invention made as described above, the image information acquisition device can effectively identify a small object in a large area of a sample, and has an effect of amplifying an existing image signal and thus can identify the object even when the object appears transparent since the degree of reflection of the object is similar to that of the sample which is a medium.

The invention claimed is:
1. An image information acquisition device comprising:
a sample unit for accommodating a sample; a driver for moving the sample unit in a first direction;
a light source for irradiating light to a partial region of the sample unit;
an optical mirror for reflecting the light having passed through the sample unit, by scattering or diffraction of the light;
an image sensor for recording, in time series, an interference image generated by light reflected from the optical mirror; and
a controller for generating image information of the sample based on a time-dependent change of the interference image,
wherein the image sensor records the interference image in time series while the driver is moving the sample unit at a preset speed along the first direction,
wherein the controller generates the image information of the sample using a temporal correlation of the interference image and a spatial correlation of the interference image, and
wherein the preset speed is determined by a detection speed recorded by the image sensor in order to derive the spatial correlation of the interference images.
2. The image information acquisition device of claim 1, further comprising a light path changing unit disposed between the sample unit and the optical mirror and configured to transmit light that has passed through the sample unit to the optical mirror and transmit the light reflected from the optical mirror to the image sensor by changing a path of the reflected light.
3. The image information acquisition device of claim 1, wherein the control unit divides the interference image into a plurality of divided regions, and generates image information of the sample based on time-dependent changes in each of the divided regions.
4. The image information acquisition device of claim 3, wherein a size of the divided region is determined by scattering intensity or diffraction intensity in the optical mirror.

* * * * *